UNITED STATES PATENT OFFICE.

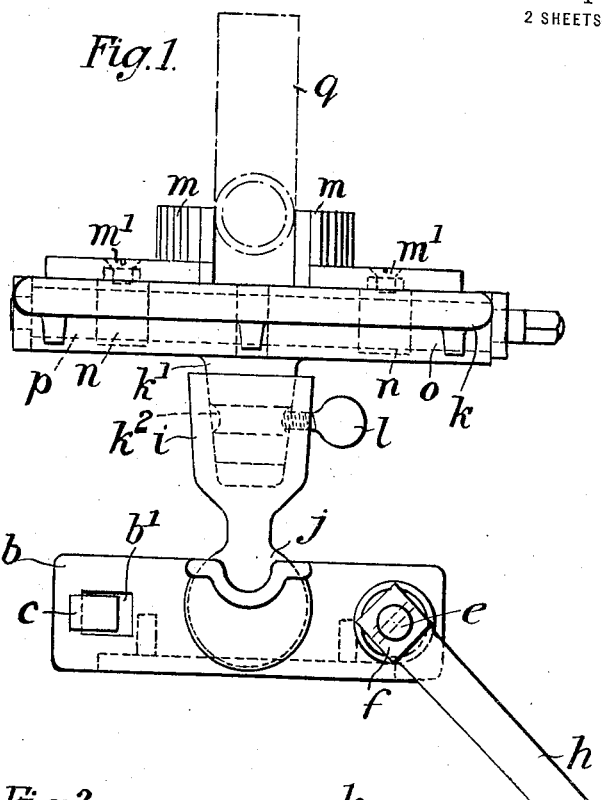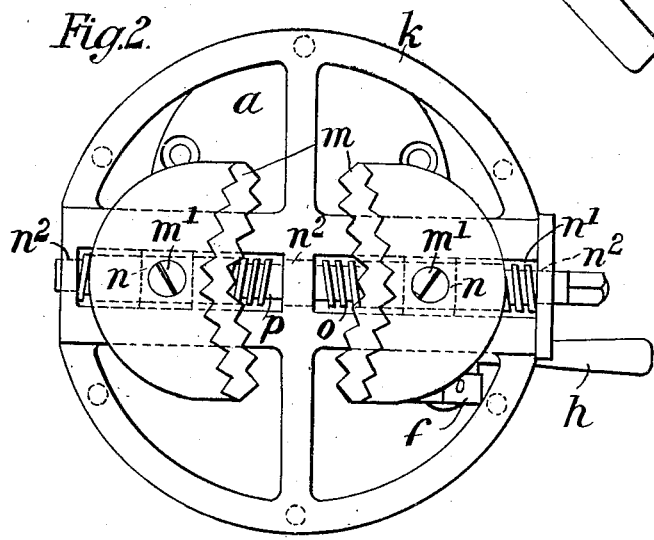

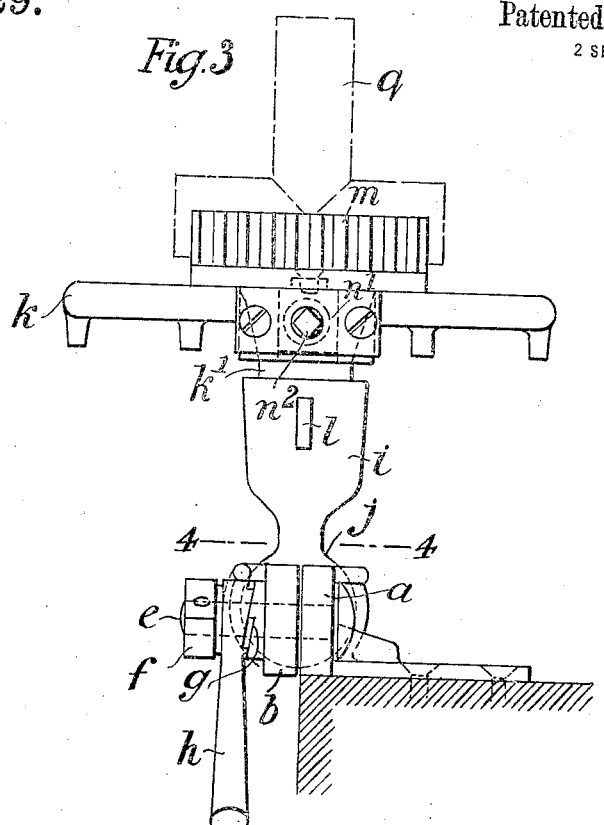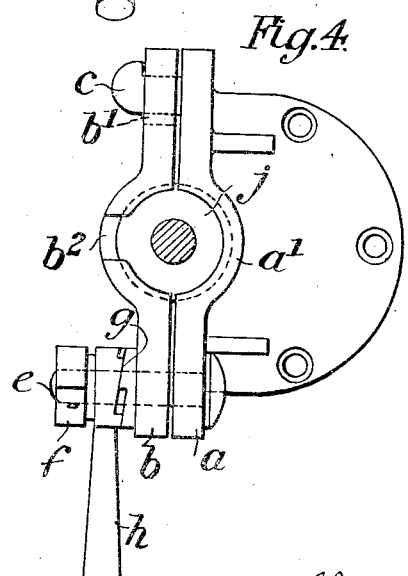

CHARLES HODDLE, OF WESTMINSTER, ENGLAND, ASSIGNOR OF ONE-HALF TO THORN & HODDLE ACETYLENE COMPANY, LIMITED, OF WESTMINSTER, LONDON, ENGLAND.

WORK-HOLDER.

1,336,229.     Specification of Letters Patent.     Patented Apr. 6, 1920.

Application filed September 6, 1919. Serial No. 322,193.

*To all whom it may concern:*

Be it known that I, CHARLES HODDLE, a subject of the King of Great Britain, residing at 151 Victoria street, Westminster, London, England, have invented a new and useful Improved Work-Holder, of which the following is a specification.

This invention has for its object an improved work-holder by means of which work can be quickly and easily clamped in any desired position relatively to the operator or to the operating tool, the appliance being particularly suitable for use in connection with oxy-acetylene welding.

According to the invention the improved work-holder comprises a clamp which is designed to be secured to the work bench, or other support, and which has connected to it, by means of a universal joint, a socket, the upper end of which has rotatably mounted in it the shank of a wheel or disk, the latter being provided with a pair of jaws adjustable radially toward or away from one another by suitable means, such as a right and left hand screw extending across the disk and engaging nuts upon which the jaws are carried.

In practice the jaws are advantageously of a curved shape, are serrated on both faces and are rotatably mounted upon the aforesaid nuts.

In the accompanying drawings:—

Figure 1 is a front view of one form of work holder embodying the invention.

Fig. 2 is a plan view thereof.

Fig. 3 is a side view of the work holder.

Fig. 4 is a section on the line 4—4, Fig. 3.

$a$ and $b$ indicate respectively the two jaws, of the clamp, the jaw $a$ being designed to be secured to the work bench, as is shown, for example, in Fig. 3, and the jaw $b$ being detachably connected to one end of the jaw $a$ by means of the hinge pin $c$ of the latter, which engages the hole $b^1$ in the jaw $b$. Any convenient clamping means may be made use of such as a bolt $e$ which passes through the jaws $a$ and $b$ and projects beyond the latter, the projecting end carrying a stop-nut $f$, between which and a boss with an inclined serrated or cam face $g$ provided on the said movable jaw, there is freely mounted a hand lever $h$ having a correspondingly inclined serrated face co-acting with the face $g$. By turning the lever, the jaws $a$ and $b$ are clamped together or released.

$i$ indicates the socket, the lower end of which is furnished with the spherical extremity or ball $j$ designed to be clamped between two hemispherical expansions $a^1$ and $b^2$ respectively of the two jaws $a$ and $b$, as clearly shown in the drawing. $k$ is the wheel or disk, the shank $k^1$ of which engages in the socket $i$ so that it can be turned therein, and which is held in position by means of the set screw $l$ which passes laterally through the socket $i$, its inner end engaging in a groove $k^2$ on the socket shank $k^1$, as shown in Fig. 1.

$m$ are the jaws which are preferably of the curved shape shown, and each of which is pivotally mounted at $m^1$ on a sliding nut $n$ working in a diametrical guide-way $n^1$ in the wheel $k$, the said nuts $n$ engaging right and left hand threads $o$ and $p$ respectively, of a screw rotatably mounted in bearings $n^2$ in the said guide-way $n^1$, and designed to be turned by a suitable key, not shown.

As best shown in Fig. 2 both sides of the jaws $m$ are toothed or serrated to permit either face of a jaw to be used as a gripping surface. By turning the jaws upon their pivots $m^1$ either side of the jaws may be caused to grip the member to be held, and this permits the jaws to grasp articles of various sizes.

By means of a work-holder of the construction above described, the position of work which is clamped between the jaws as indicated in broken lines at $q$ Figs. 1 and 3. can be adjusted to bring it into any desired position relatively to the operator or to the operating tool, such for example, as an oxygen-acetylene welding blowpipe and the construction and arrangement of the jaws $m$ is such that the latter lend themselves to the clamping of a large variety of differently shaped articles.

Claim.

A work holder comprising a member provided with means to permit its attachment to a support and having a semi-spherical enlargement, another member having one of its ends hinged to the first member and its other end detachably secured to the first member, the second member also having a semi-spherical enlargement which coöperates with the enlargement of the first member to form a substantially spherical casing, a ball located in the casing and carrying a socket, a shank resting in the socket, means for locking the shank and socket together, a wheel fixed to the shank, and a plurality of relatively movable jaws mounted on the wheel.

CHARLES HODDLE.